US012135959B2

(12) United States Patent
Arai

(10) Patent No.: US 12,135,959 B2
(45) Date of Patent: Nov. 5, 2024

(54) NON-TRANSITORY COMPUTER-READABLE MEDIUM, COMPUTER, AND METHOD FOR VISUAL PROGRAMMING EDITOR

(71) Applicant: OMRON Corporation, Kyoto (JP)

(72) Inventor: Wataru Arai, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 91 days.

(21) Appl. No.: 17/928,539

(22) PCT Filed: Mar. 1, 2021

(86) PCT No.: PCT/JP2021/007612
§ 371 (c)(1),
(2) Date: Nov. 29, 2022

(87) PCT Pub. No.: WO2022/004053
PCT Pub. Date: Jan. 6, 2022

(65) Prior Publication Data
US 2023/0214194 A1    Jul. 6, 2023

(30) Foreign Application Priority Data
Jun. 30, 2020  (JP) ................................ 2020-112588

(51) Int. Cl.
G06F 8/34    (2018.01)
G06F 8/33    (2018.01)
G06F 8/73    (2018.01)

(52) U.S. Cl.
CPC .................. *G06F 8/34* (2013.01); *G06F 8/33* (2013.01); *G06F 8/73* (2013.01)

(58) Field of Classification Search
USPC ....................................................... 717/109
See application file for complete search history.

(56) References Cited

U.S. PATENT DOCUMENTS

2003/0221186 A1* 11/2003 Bates .................. G06F 11/3664
717/125
2006/0041856 A1*  2/2006 Holloway ................. G06F 8/20
717/101
(Continued)

FOREIGN PATENT DOCUMENTS

WO    2019/132037 A1    7/2019

OTHER PUBLICATIONS

International Search Report for PCT/JP2021/007612 dated Jun. 1, 2021.
(Continued)

*Primary Examiner* — Qing Chen
*Assistant Examiner* — Clint Thatcher
(74) *Attorney, Agent, or Firm* — Sughrue Mion, PLLC

(57) ABSTRACT

A non-transitory computer-readable medium includes a program causing one or more processors to execute disposing one or more program components and one or more comments on a screen of a visual programming editor based on acceptance of an operation, determining whether to associate a specific comment with a specific program component based on a positional relationship between the specific comment included in the one or more comments and the specific program component included in the one or more program components, and generating a text-based code in which a text of the specific comment and a text of the specific program component are disposed nearby based on determination that the specific comment is associated with the specific program component.

15 Claims, 16 Drawing Sheets

(56) References Cited

U.S. PATENT DOCUMENTS

| | | | |
|---|---|---|---|
| 2012/0151347 A1* | 6/2012 | McClements, IV | G11B 27/34 715/716 |
| 2014/0199046 A1* | 7/2014 | Lindsey | H04N 21/4788 386/244 |
| 2014/0280110 A1* | 9/2014 | Simitsis | G06F 16/24578 707/771 |
| 2015/0378518 A1 | 12/2015 | Heydlauf | |
| 2016/0266896 A1 | 9/2016 | Fan et al. | |
| 2017/0115834 A1* | 4/2017 | Ota | G06F 40/284 |
| 2018/0150437 A1* | 5/2018 | Liang | G06F 40/106 |
| 2019/0250891 A1 | 8/2019 | Kumar et al. | |
| 2019/0260699 A1* | 8/2019 | Carriero | H04L 51/08 |
| 2019/0272158 A1 | 9/2019 | Ueda et al. | |
| 2020/0028806 A1* | 1/2020 | Cacioppo | H04L 67/1097 |
| 2020/0183367 A1* | 6/2020 | Usui | G05B 19/4183 |
| 2021/0318865 A1* | 10/2021 | Farivar | G06F 8/73 |

OTHER PUBLICATIONS

Communication dated Jun. 10, 2024 issued by the European Patent Office in application No. 21832646.0.

* cited by examiner

FIG.10

```
1030A ── # AUTHOR: A, VERSION: 1.3.1
1030B ── # TODO: CONTACT SALES ABOUT OPERATION CHECKING RESULT

1030C ── # PRODUCT POSITIONAL INFORMATION
1030D ── # ONE TIME/100 MILLISECONDS ACQUISITION
         SENSOR DATA ACQUISITION:
1010A      sensor_name: sensor_1
           read_rate: 100
           forward_to: [CSV FILE PREPARATION, LOG OUTPUT]
         CSV FILE PREPARATION:
           column_name: sensor_1
1010B      max_lines: 10000
           filename: ${timestamp}_sensor_1.csv
           forward_to: [PRESERVATION IN SMB]
1030E ── # FIXME: NAS IS TENTATIVE
         PRESERVATION IN SMB:
           ip_address: 192.168.250.101
1010C      user: developer
           password: development_environment_password
           destination_directory: /line_A/sensor_data/sensor_1
1030F ── # ───────FOR DEBAG FROM HERE
1010D    LOG OUTPUT:
           log_level: DEBUG
```

1050

NON-TRANSITORY COMPUTER-READABLE MEDIUM, COMPUTER, AND METHOD FOR VISUAL PROGRAMMING EDITOR

CROSS REFERENCE TO RELATED APPLICATIONS

This application is a National Stage of International Application No. PCT/JP2021/007612 filed Mar. 1, 2021, claiming priority based on Japanese Patent Application No. 2020-112588 filed Jun. 30, 2020, the contents of each of which being herein incorporated by reference in their entireties.

TECHNICAL FIELD

The present disclosure relates to a program of a visual programming editor, more specifically to a conversion technique of a program prepared by the visual programming editor.

BACKGROUND ART

In recent years, visual programming preparing a program by combining a block-shaped program component and the like using a visual program editor becomes widespread. Some visual program editors include a function for converting a code prepared using the visual program editor into a text-based code. However, when the code prepared using the visual program editor is converted into the text-based code, the program component and a comment to the program component are not disposed in the vicinity, and sometimes a less readable text-based code is generated.

Regarding the visual programming, for example, WO 2018/092237 (PTL 1) discloses a program code generation device including "a block diagram acquisition portion that acquires a block diagram defining a data processing procedure to be reflected in a program code by connection of a plurality of blocks and a contradiction check portion that checks whether a contradiction exists in the data processing procedure defined in the block diagram by tracing the connection between the blocks in the block diagram" (see paragraph [0006]).

In addition, other techniques related to visual programming are disclosed in, for example, WO 2019/026248 (PTL 2) and WO 2019/132037 (PTL 3).

CITATION LIST

Patent Literatures

PTL 1: WO 2018/092237
PTL 2: WO 2019/026248
PTL 3: WO 2019/132037

SUMMARY OF INVENTION

Technical Problem

According to the technology disclosed in PTLs 1 to 3, when the code prepared using the program editor is converted into the text-based code, the program component and the comment to the program component cannot be disposed in the vicinity. Accordingly, there is a need for a technique for disposing the program component and the comment to the program component in the vicinity when the code prepared using the program editor is converted into the text-based code.

The present disclosure has been made in view of the above background, and an object of the present disclosure in one aspect is to provide a technique for disposing the program component and the comment to the program component in the vicinity when the code prepared using the program editor is converted into the text-based code.

Solution to Problem

In one example of the present disclosure, there is provided a program causing at least one processor to execute: disposing one or a plurality of program components and one or a plurality of comments on a screen of a visual programming editor based on acceptance of an operation; determining whether to associate a specific comment with a specific program component based on a positional relationship between the specific comment included in the one or the plurality of comments and the specific program component included in the one or the plurality of program components; and generating a text-based code in which a text of the specific comment and a text of the specific program component are disposed nearby based on the determination that the specific comment is associated with the specific program component.

According to the above disclosure, the program can dispose the relevant program component and comment nearby in the text-based code.

In the above disclosure, the determining whether to associate the specific comment with the specific program component includes: determining whether a distance from the specific comment to the specific program component is less than or equal to a threshold that is predetermined; and associating the specific comment and the specific program component based on the distance that is less than or equal to the threshold.

According to the above disclosure, the program can associate the specific comment and the specific program component based on the threshold.

In the above disclosure, the program further causes the at least one processor to execute disposing a text of a comment that is not associated with any of the one or the plurality of program components at a head of the text-based code in the text-based code based on the comment that is not associated with any of the one or the plurality of program components.

According to the above disclosure, the program can dispose a comment that is not associated with any program component at an appropriate location in the text-based code.

In the above disclosure, the program further causes the at least one processor to execute displaying a range of the threshold based on acceptance of an operation of bringing the specific comment close to a certain range of the specific program component.

According to the above disclosure, the program can visually indicate the range of the threshold to the user.

In the above disclosure, disposing the one or the plurality of program components and the one or the plurality of comments on the screen of the visual programming editor includes disposing a first program component, a second program component, and the specific comment. The program further causes the at least one processor to execute associating the specific comment with the component with the shortest distance to the specific comment between the first program component and the second program component based on a fact that a distance between the specific comment and each of the first program component and the second program component is less than or equal to the threshold.

According to the above disclosure, the program can uniquely select the program component with which the comment is associated.

In the above disclosure, the program further causes the at least one processor to execute setting a certain range close to both the first program component and the second program component to an invalid range in which the specific comment is not associated with each of the first program component and the second program component when the first program component and the second program component are disposed adjacent to each other.

According to the above disclosure, the program can uniquely select the program component with which the comment is associated.

In the above disclosure, the disposing the one or the plurality of program components and the one or the plurality of comments on the screen of the visual programming editor includes disposing the specific program component, a first comment, and a second comment. The program further includes determining display order of the first comment and the second comment in the text-based code based on a distance from each of the first comment and the second comment to the specific program component based on a fact that both the first comment and the second comment are associated with the specific program component.

According to the above disclosure, the program can appropriately determine the disposition of the plurality of comments in the text-based code.

In the above disclosure, the program further causes the at least one processor to execute releasing association between the specific comment and the specific program component based on acceptance of an operation to separate the distance between the specific comment and the specific program component that are associated with each other by more than the threshold.

According to the above disclosure, the program can provide association releasing means of the program component and the comment.

In the above disclosure, the program further causes the at least one processor to execute releasing the association of the specific comment and the specific program component and separate the distance between the specific comment and the specific program component by more than the threshold based on double-clicking of the specific comment associated with the specific program component.

According to the above disclosure, the program can provide association releasing means of the program component and the comment.

In the above disclosure, the program further causes the at least one processor to execute associating or association-releasing the specific comment and the specific program component regardless of the distance between the specific comment and the specific program component based on acceptance of input of a manual association control instruction.

According to the above disclosure, the program can provide association releasing means of the program component and the comment.

In the above disclosure, the program further causes the at least one processor to execute changing a color of the specific comment and the specific program component that are associated with each other based on associating the specific comment and the specific program component.

According to the above disclosure, the program can visually display the association between the program component and the comment.

In the above disclosure, the program further causes the at least one processor to execute displaying a connection line for the specific comment and the specific program component that are associated with each other based on the association of the specific comment and the specific program component.

According to the above disclosure, the program can visually display the association between the program component and the comment.

In the above disclosure, the program further causes the at least one processor to execute displaying a frame enclosing the specific comment and the specific program component that are associated with each other based on the association of the specific comment and the specific program component.

According to the above disclosure, the program can visually display the association between the program component and the comment.

In another example of the disclosure, there is provided a computer including: a memory storing the program according to any one of the above-described disclosure; and at least one processor configured to execute the program.

According to the above disclosure, the program can dispose the relevant program component and comment nearby in the text-based code.

A method related to code conversion in a computer is provided in still another example of the disclosure. The method includes: disposing one or a plurality of program components and one or a plurality of comments on a screen of a visual programming editor based on acceptance of an operation; determining whether to associate a specific comment with a specific program component based on a positional relationship between the specific comment included in the one or the plurality of comments and the specific program component included in the one or the plurality of program components; and generating a text-based code in which a text of the specific comment and a text of the specific program component are disposed nearby based on the determination that the specific comment is associated with the specific program component.

According to the above disclosure, the program can dispose the relevant program component and comment nearby in the text-based code.

Advantageous Effects of Invention

According to an embodiment, the program component and the comment to the program component can be disposed in the vicinity when the code prepared using the program editor is converted into the text-based code.

The foregoing and other objects, features, aspects and advantages of the present disclosure will become more apparent from the following detailed description of the present disclosure when taken in conjunction with the accompanying drawings.

BRIEF DESCRIPTION OF DRAWINGS

FIG. 10 is a view illustrating an example of a text program 1050 prepared based on a program P.

DESCRIPTION OF EMBODIMENT

Figure 1:
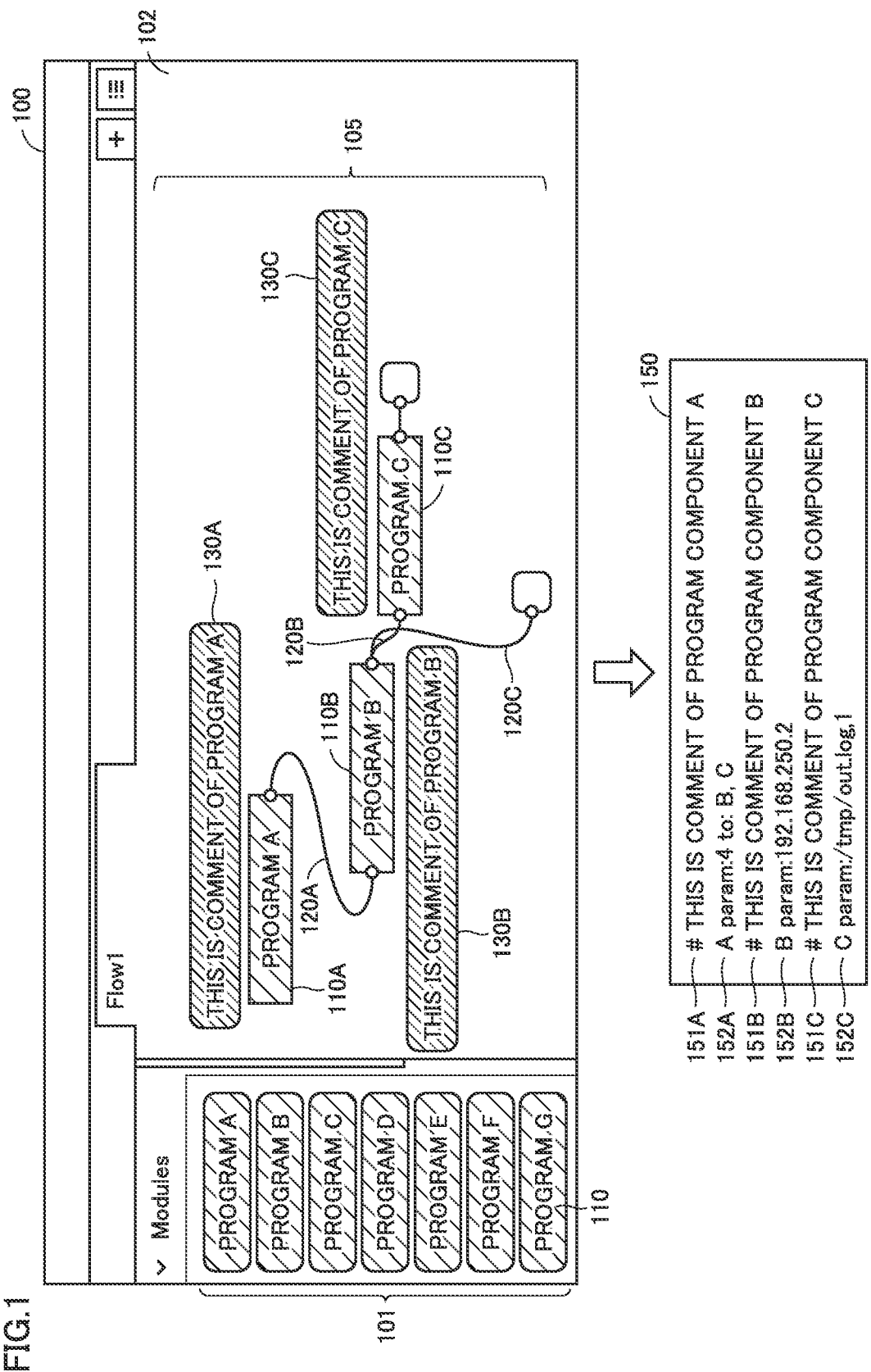
FIG. 1 is a view illustrating an example of a visual programming editor 100 according to an embodiment.

Hereinafter, an embodiment of the technical idea according to the present disclosure will be described with reference to the drawings. In the following description, the same component is denoted by the same reference numeral. Those names and functions are the same. Accordingly, the detailed description thereof will not be repeated.

<A. Application Example>

Figure 7:
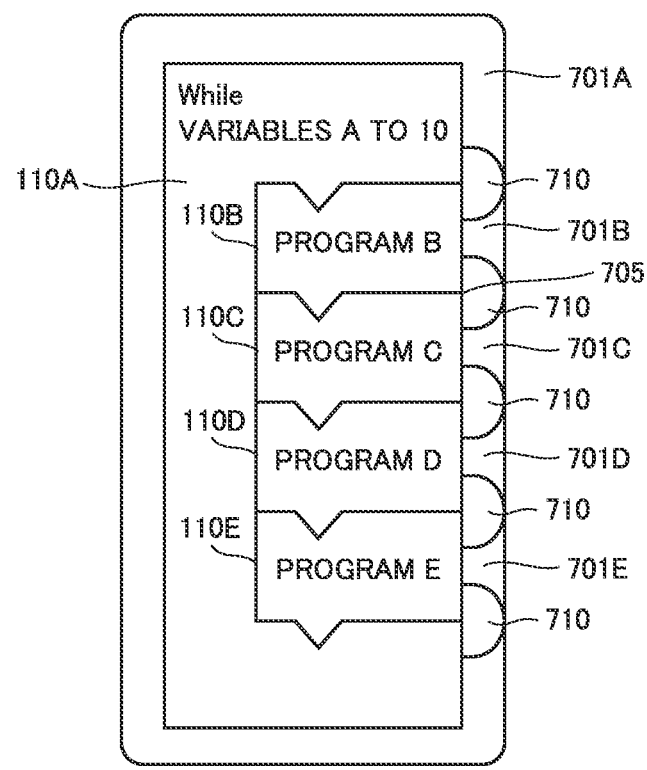
FIG. 7 is a view illustrating another example of a visual program.

FIG. 1 is a view illustrating an example of a visual programming editor 100 according to an embodiment. With reference to FIG. 1, a source code conversion function of visual programming editor 100 will be described. For example, visual programming editor 100 can provide a function for executing a flow-type visual programming of combining a block-shaped program component and a connector as illustrated in FIG. 1. In one aspect, visual programming editor 100 may provide a function for executing programming by superimposing blocks as illustrated in FIG. 7. In another aspect, visual programming editor 100 may provide a function for executing programming using any visual representation.

Hereinafter, a program code visually prepared using visual programming editor 100 is referred to as a "visual program" for distinction. On the other hand, a text-based program code is referred to as a "text program". Visual programming editor 100 includes a program component list 101 and an editor 102.

Program component list 101 includes a list of program components 110. For example, program component 110 is a component of a program having a certain function. Editor 102 is a region where the visual program is prepared. For example, a user can insert program component 110 selected from program component list 101 into the editor 102 by drag-and-drop. In addition, the user can set output data of certain program component 110 as input data of another program component 110 to prepare one program as a whole by defining connection between program components 110 using a connector 120.

In the example of FIG. 1, program components 110A to 110C exist on editor 102. Program component 110A and program component 110B are connected to each other by a connector 120A. This indicates that the output data of program component 110A is passed as the input data of program component 110B. Program component 110B and program component 110C are connected to each other by a connector 120B. This indicates that the output data of program component 110B is passed as the input data of program component 110C. Program component 110B and a termination component are connected to each other by a connector 120C. For example, this indicates that the output data of program component 110B is output as the output of a visual program 105.

The user may further dispose a comment 130 on editor 102. In the example of FIG. 1, comments 130A to 130C are disposed on editor 102. Each of these comments 130A to 130C is a comment for each of program components 110A to 110C. Comment 130 may be associated with certain program component 110 or may not be associated with any program component 110. For example, comment 130 not associated with any program component 110 is a comment on the entire program.

Visual programming editor 100 has a function for converting visual program 105 prepared by a combination of program component 110, connector 120, and comment 130 into a text program 150. The comment and code included in text program 150 have the same contents as the comment and code included in visual program 105. For example, comments 151A to 151C included in text program 150 correspond to comments 130A to 130C included in visual program 105. In addition, codes 152A to 152C included in text program 150 correspond to program components 110A to 110C included in visual program 105. As an example, each of codes 152A to 152C may also include information about connector 120 in visual program 105.

Typically, in the source code prepared in the text, the comment is often written immediately before the corresponding code. When a distance between the comment and the code corresponding to the comment increases, readability of the program is significantly impaired. For this reason, visual program 105 disposes comment 130 and program component 110 to be associated in the vicinity or adjacent to each other on text program 150 based on the positional relationship or distance between each comment 130 and program component 110.

In one aspect, the user may be able to freely move each program component 110, connector 120, and comment 130 disposed on editor 102 by drag-and-drop. In another aspect, the user may directly input coordinates of each program component 110, connector 120, and comment 130 disposed on editor 102. In another aspect, the user may set properties and the like for each program component 110, connector 120, and comment 130 disposed on editor 102 using another screen, a side menu, a dialog, or the like.

<B. Association of Comment and Program Component>

With reference to FIGS. 2 to 7, how visual programming editor 100 associates each comment 130 and each program component 110 and disposes associated comments 130 and program components 110 adjacent to each other on text program 150 will be described below.

Figure 2:
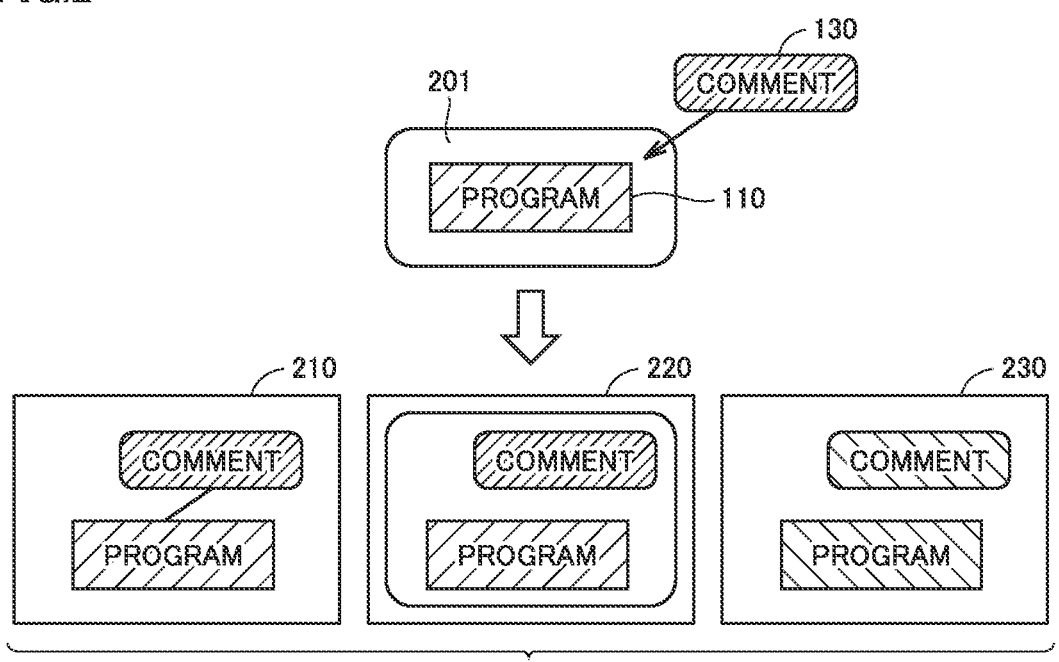
FIG. 2 is a view illustrating a first example of association between a comment 130 and a program component 110.

FIG. 2 is a view illustrating a first example of association between comment 130 and program component 110. On editor 102, an association region 201 is set around program component 110. When the block of comment 130 comes into contact with association region 201, comment 130 and program component 110 are associated with each other. In other words, when a distance between comment 130 and program component 110 is less than or equal to a predetermined threshold, comment 130 and program component 110 are associated with each other.

In one aspect, the distance between comment 130 and program component 110 can include a center-to-center distance between the block of comment 130 and the block of program component 110, a distance between specific angles, a distance between frames, and the like. In another aspect, visual programming editor 100 may associate comment 130 and program component 110 based on contact of a mouse cursor grabbing comment 130 with association region 201.

As an example, visual programming editor 100 may dynamically execute the association of each comment 130 and each program component 110 by comparing the threshold with the distance between each comment 130 and each program component 110 each time a user operation is accepted.

Visual programming editor 100 may also change the display of associated comment 130 and program component 110 to visually indicate to the user that specific comment 130 and program component 110 are associated with each other.

Displays 210, 220, and 230 are examples of the displays illustrating associated comment 130 and program component 110. In one aspect, visual programming editor 100 may connect associated comment 130 and program component 110 by a comment connector. The comment connector may be different in thickness and/or color from connector 120 for distinction. In another aspect, visual programming editor 100 may frame associated comment 130 and program component 110. In still another aspect, visual programming editor 100 may change the color of associated comment 130 and program component 110. Furthermore, in yet another aspect, visual programming editor 100 may appropriately combine displays 210, 220, and 230.

As described above, visual programming editor 100 can determine whether there is the clear association between comment 130 and program component 110 based on a positional relationship between comment 130 and program component 110 or a distance between comment 130 and program component 110. In addition, visual programming editor 100 can visually present the association between comment 130 and program components 110 to the user by changing the display of associated comment 130 and program component 110.

Figure 3:
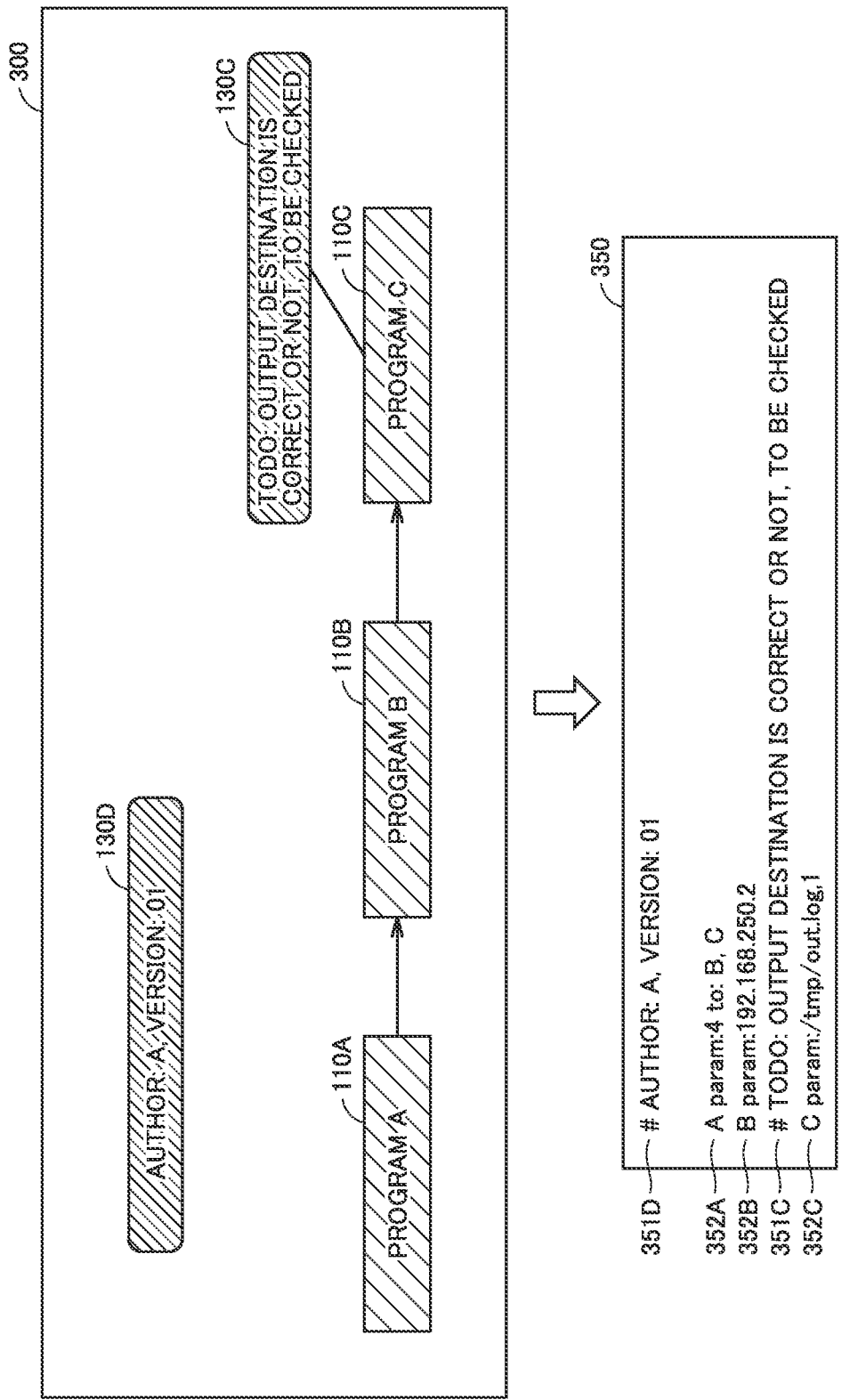
FIG. 3 is a view illustrating a second example of the association between the comment 130 and the program component 110.

FIG. 3 is a view illustrating a second example of the association between comment 130 and program component 110. The comment of the program may include a comment for certain code and a comment referring to the entire program. Visual programming editor 100 determines comment 130 not associated with any program component 110 as the comment indicating the entire program. In other words, visual programming editor 100 determines comment 130 separated from any program component 110 by the distance greater than or equal to an association threshold as the comment indicating the entire program.

In the example of FIG. 3, comment 130D is not associated with any of program components 110A to 110C, so that comment 130D is the comment indicating the entire program. Conversely, comment 130C is associated with program component 110C, so that comment becomes the comment for a specific code (program component 110C).

For example, visual programming editor 100 outputs the text program based on the acceptance of input of a text program generation instruction from the user. A text program 350 corresponds to a visual program 300.

Each of codes 352A to 352C corresponds to each of program components 110A to 110C. A comment 351C corresponds to comment 130C. A comment 351D corresponds to comment 130D.

Visual programming editor 100 disposes comment 130D, which is not associated with any program component 110, at a head of text program 350. In one aspect, when visual program 300 includes comment 130 that is not associated with any of the plurality of program components 110, visual programming editor 100 may dispose all these comments 130 at the head of text program 150.

Visual programming editor 100 disposes comment 351C in the vicinity of code 352C. In one aspect, visual programming editor 100 may dispose comment 351C in the line immediately before or after code 352C. In another aspect, visual programming editor 100 may add comment 351C to an end of code 352C.

As described above, visual programming editor 100 disposes comment 130 and program component 110 associated with each other in the vicinity on the text program, and disposes comment 130 that is not associated with any program component 110 at the head of the text program. Thus, for example, the comment of the entire program is disposed in the vicinity of the head of the text program, and the comment for each code is disposed in the line or the like immediately before each code. As a result, the readability of the text program generated from the visual program is improved.

Figure 4:
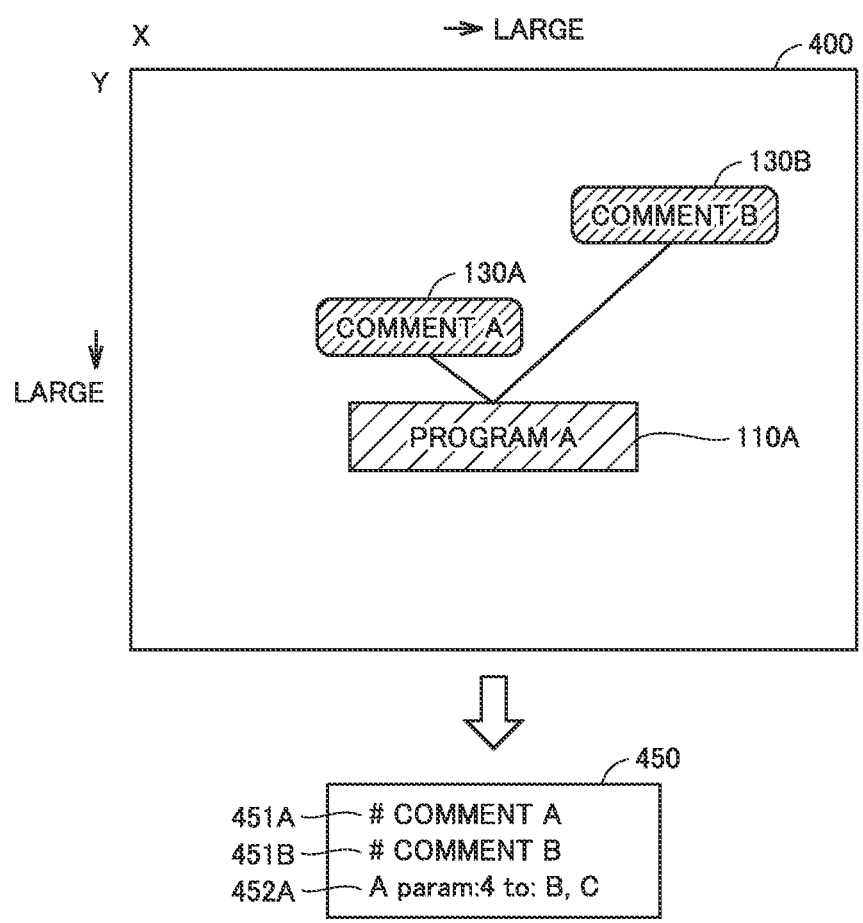
FIG. 4 is a view illustrating a third example of the association between the comment 130 and the program component 110.

FIG. 4 is a view illustrating a third example of the association between comment 130 and program component 110. In the example of FIG. 4, a plurality of comments 130A and 130B are associated with one program component 110A in a visual program 400.

It is assumed that visual programming editor 100 prepares a text program 450 based on visual program 400. Text program 450 includes comments 451A and 451B corresponding to comments 130A and 130B, respectively, and a code 452A corresponding to program component 110A.

In such the case, visual programming editor 100 may determine disposition order of comments 130A and 130B based on the distance from program component 110A to each of comment 451A and 451B. In the example of FIG. 4, comment 130A is closer to program component 110A than comment 130B. Therefore, visual programming editor 100 disposes each comment immediately before code 452A in the order of comment 451A and comment 451B.

In one aspect, visual programming editor 100 may preferentially dispose comment 130 at the position closer to certain program component 110 on the text program. In another aspect, visual programming editor 100 may preferentially dispose comment 130 at the position farther from certain program component 110 on the text program.

As described above, the plurality of comments 130 are sometimes associated with program component 110. In this case, visual programming editor 100 can determine priority order of disposition of each comment on the text program based on the distance from program component 110 to each comment 130. With this function, the user can change the order of the comments disposed on the text program by adjusting the position of comment 130 on editor 102.

Figure 5:
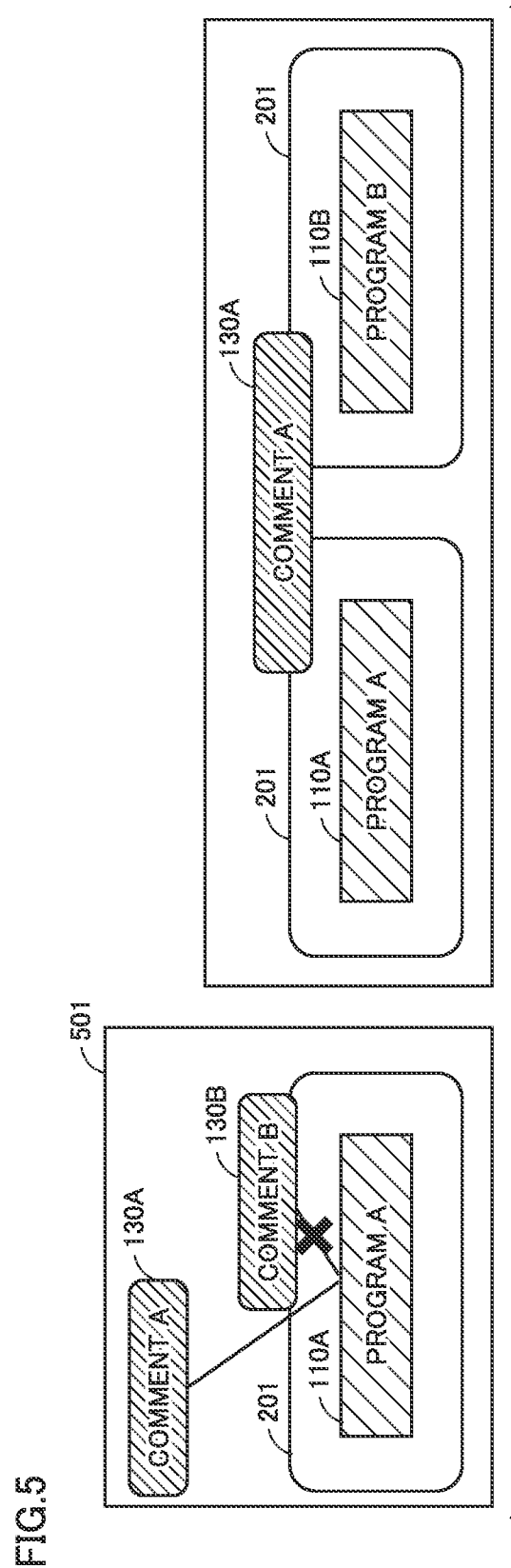
FIG. 5 is a view illustrating a fourth example of the association between the comment 130 and the program component 110.

FIG. 5 is a view illustrating a fourth example of the association between comment 130 and program component 110. The fourth example includes a special association example 501 and an association example 502. Association example 501 indicates association control of comment 130 and program component 110 by the user operation. Visual programming editor 100 can execute the association or association deletion between comment 130 and program component 110 regardless of the distance between comment 130 and program component 110 by accepting the input of the manual association control from the user.

For example, visual programming editor 100 may associate comment 130A outside association region 201 with program component 110A based on the acceptance of the input of the manual association control from the user. Furthermore, visual programming editor 100 may delete the association between comment 130B and program component 110A in association region 201 based on the acceptance of the input of the manual association control from the user. In one aspect, visual programming editor 100 may delete the association based on accepting the operation of moving comment 130 or the comment connector to the outside of association region 201. In another aspect, visual programming editor 100 may delete the association based on double click of comment 130 or the comment connector. Furthermore, at that time, visual programming editor 100 may move comment 130 in which the association is deleted to the outside of association region 201.

Association example 502 indicates the association control of comment 130A when comment 130A is in contact with association region 201 of the plurality of program components 110A and 110B. In the case of association example 502, visual programming editor 100 compares the distance between comment 130A and program component 110A with the distance between comment 130B and program component 110A, and associates program component 110 closer to comment 130A with comment 130A.

Visual programming editor 100 similarly associates comment 130 with closest program component 110 even when comment 130 is in contact with association region 201 of at least three program components 110.

As described above, visual programming editor 100 provides the manual association function of comment 130 and program component 110. With this function, the user can more flexibly associate comment 130 and program component 110. In addition, visual programming editor 100 provides the association control function of comment 130 when comment 130 is in contact with association region 201 of the plurality of program components 110. With this function, program component 110 can always execute consistent control of association between comment 130 and program component 110.

Figure 6:
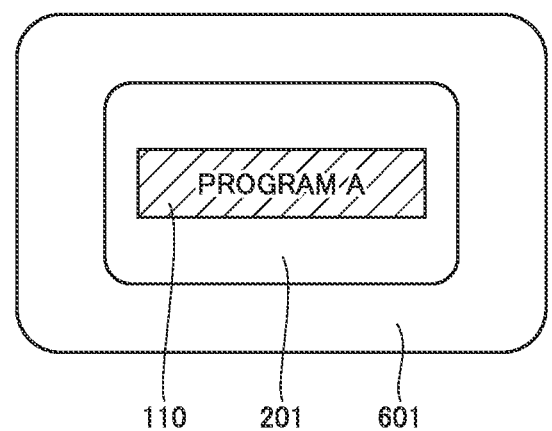
FIG. 6 is a view illustrating an example of a change in display of the program component 110 on an editor 102.

FIG. 6 is a view illustrating an example of a change in display of program component 110 on editor 102. Association region 201 and a wider reaction region 601 exist around program component 110. Visual programming editor 100 associates comment 130 with program component 110 when comment 130 comes into contact with association region 201.

Visual programming editor 100 displays association region 201 on editor 102 when comment 130 is in contact with reaction region 601. With this function, the user can clearly recognize association region 201 of program component 110. Each of program component 110, association region 201, and reaction region 601 may have any size.

FIG. 7 is a view illustrating another example of the visual program. The visual program in FIG. 7 is different from the visual program of the flow-type visual program in FIG. 1 in that program component 110 is stacked. Visual programming editor 100 may provide a function for editing a block-type visual program in FIG. 7.

Visual programming editor 100 sets the periphery of each program component 110 as the association region in the block-type visual program. For example, a region 701A is the association region of program component 110A. Similarly, each of regions 701B to 701E is the association region of each of program components 110B to 110E.

In the block-type visual program, program components 110 is sometimes adjacent to each other, such as am adjacent part 705 between program components 110A and 110B. It is unclear which adjacent program component 110 the region near adjacent part 705 belongs to. Accordingly, visual programming editor 100 may set the periphery of adjacent part 705 to an invalid region 710 that is not associated. Even when comment 130 comes into contact with invalid region 710, visual programming editor 100 does not associate comment 130 with any program component 110. Visual programming editor 100 associates comment 130 with program component 110 only when comment 130 is in contact with any association region 701.

As described above, visual programming editor 100 can provide a function for associating comment 130 and program component 110 also in the block-type visual program. Furthermore, visual programming editor 100 can clearly associate comment 130 with any one of program components 110 by setting the vicinity of the contact part between adjacent program components 110 as the invalid region.

<C. Conversion Example from Visual Program into Text Program>

Figure 8:
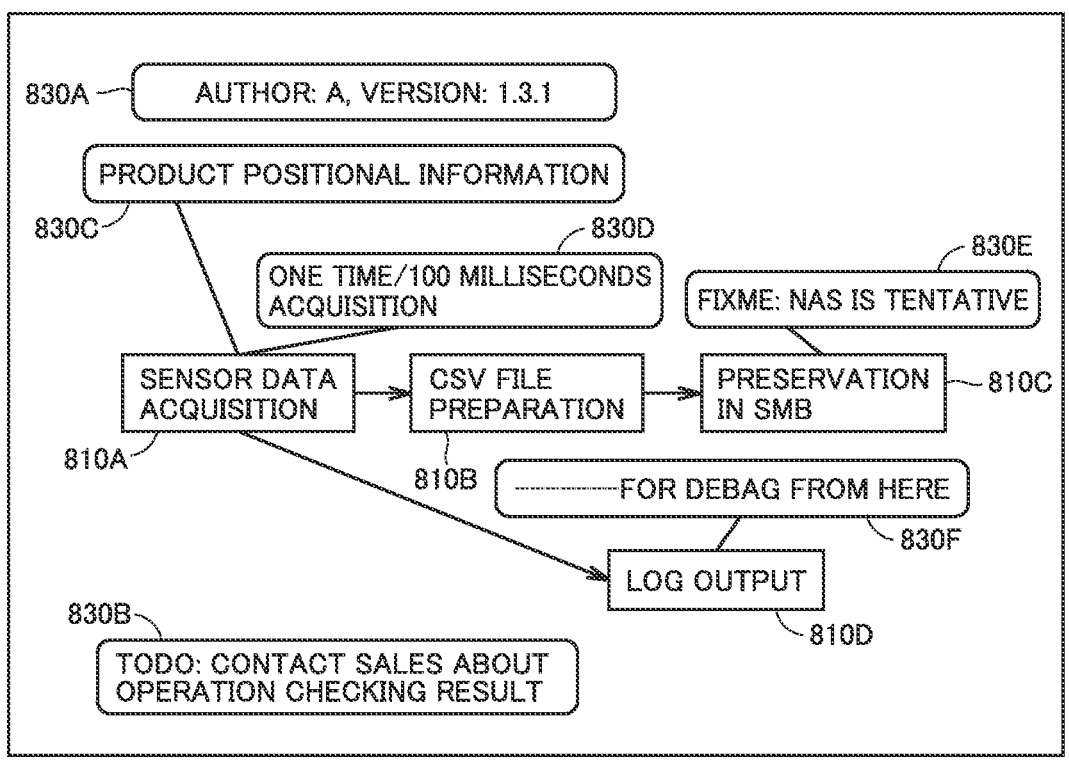
FIG. 8 is a view illustrating an example of a flow-type visual program.
Figure 9:
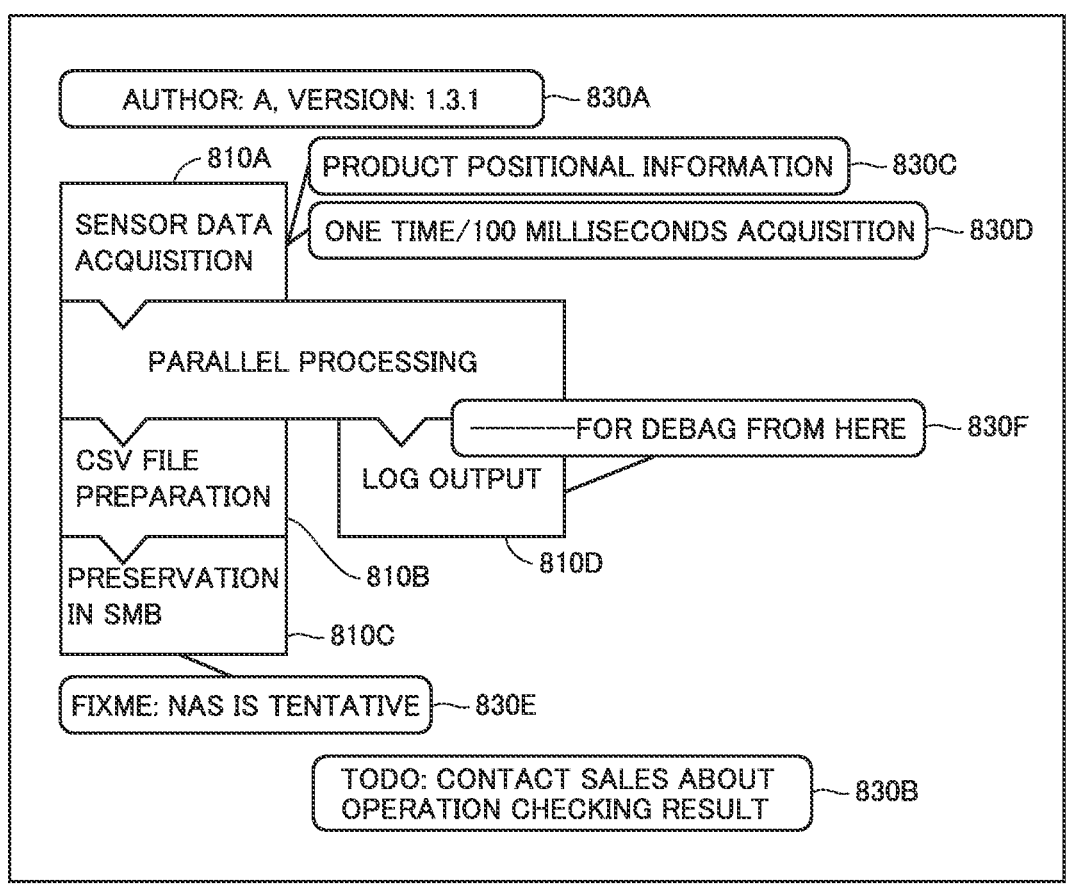
FIG. 9 is a view illustrating an example of a block-type visual program.

With reference to FIGS. 8 to 10, an example of generating the text program from the visual program will be described below. FIG. 8 is a view illustrating an example of the flow-type visual program. FIG. 9 is a view illustrating an example of the block-type visual program. The visual programs in FIGS. 8 and 9 indicate the same program (hereinafter, the program is represented as a "program P"). Program P includes program components 810A to 810D. In addition, program P includes comments 830A and 830B that are not associated with any program component and comments 830B to 830F that are associated with any of program components 810A to 810D.

FIG. 10 is a view illustrating an example of a text program 1050 prepared based on program P. Text program 1050 includes comments 1030A to 1030F and codes 1010A to 1010D. The parameters and the like included in each code can be set on visual programming editor 100.

Each of comments 1030A and 1030B corresponds to each of comments 830A and 830B that are not associated with any program component. Accordingly, comments 1030A and 1030B are disposed at the head of text program 1050. When a plurality of comments that are not associated with any program component exist, visual programming editor 100 may determine the priority order of the display of the comments based on, for example, an arbitrary standard such as the distance from an upper left coordinate of editor 102 to each comment.

Each of comments 1030C and 1030D corresponds to each of comments 830C and 830D associated with program component 810A. Accordingly, comments 1030C and 1030D are disposed immediately before code 1010A corresponding to program component 810A.

Comment 1030E corresponds to comment 830E associated with program component 810C. Accordingly, comment 1030E is disposed immediately before code 1010C corresponding to program component 810C.

Comment 1030F corresponds to comment 830F associated with program component 810D. Accordingly, comment 1030F is disposed immediately before code 1010D corresponding to program component 810D.

As described above, visual programming editor 100 generates the text program based on the visual program prepared on editor 102. At that time, visual programming editor 100 can dispose the comment at an appropriate position on the text program based on the comment and the association information about the program component. With this function, the user can obtain the text program with high readability.

<D. System Configuration>

Figure 11:
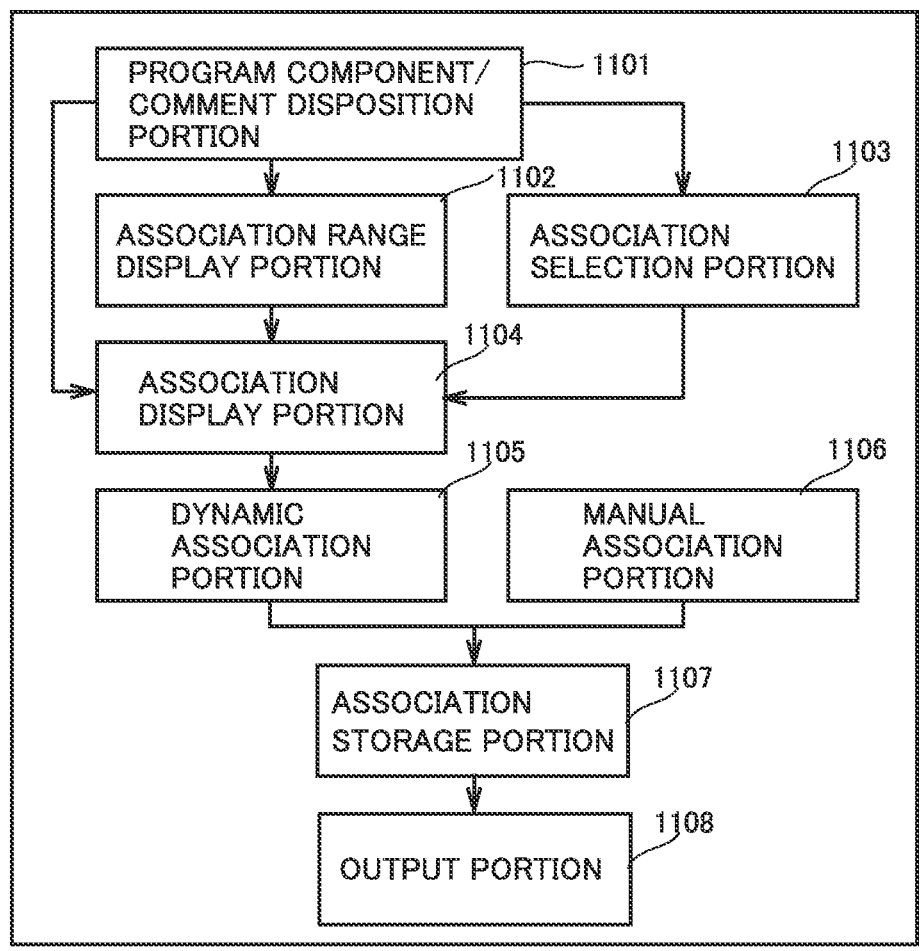
FIG. 11 is a view illustrating an example of a functional block of the visual programming editor 100.

FIG. 11 is a view illustrating an example of a functional block of visual programming editor 100. Each functional block in FIG. 11 may be implemented as the program. In addition, these functional blocks can be executed on the hardware in FIG. 12.

Visual programming editor 100 includes a program-component and comment disposition portion 1101, an association range display portion 1102, an association selection portion 1103, an association display portion 1104, a dynamic association portion 1105, a manual association portion 1106, an association storage portion 1107, and an output portion 1108.

Program-component and comment disposition portion 1101 disposes program component 110 or comment 130 on editor 102 based on the acceptance of the user operation. Alternatively, program-component and comment disposition portion 1101 moves program component 110 or comment 130 on editor 102 based on the acceptance of the user operation.

Association range display portion 1102 displays association region 201 on editor 102. In one aspect, association range display portion 1102 may always display association region 201. In another aspect, association range display portion 1102 may display association region 201 based on the fact that comment 130 approaches program component 110 by a certain distance (reaction region 601).

Association selection portion 1103 selects associated comment 130 and program component 110. For example, when comment 130 is in contact with association region 201 of the plurality of program components 110, association selection portion 1103 can select program component 110 corresponding to the shortest distance from comment 130.

Association display portion 1104 displays the association of comment 130 and program component 110 on editor 102. In one aspect, association display portion 1104 may display the comment connector connecting comment 130 and program component 110. In another aspect, association display portion 1104 may surround associated comment 130 and program component 110 with a frame. In another aspect, association display portion 1104 may change colors of associated comment 130 and program component 110.

Dynamic association portion 1105 executes association processing of comment 130 and program component 110 based on detection of the disposition or movement of comment 130 or program component 110.

Manual association portion 1106 executes the association processing of comment 130 and program component 110 based on the acceptance of the input of the manual association control from the user. The processing corresponds to the processing described with reference to FIG. 5.

Association storage portion 1107 stores association information about associated comment 130 and program component 110. Association storage portion 1107 can store the association information about associated comment 130 and program component 110 in either a primary storage device 1202 or a secondary storage device 1203 described later.

Output portion 1108 outputs the text program with reference to the association information about comment 130 and program component 110, which are stored in association storage portion 1107, based on the acceptance of the output request input of the text program from the user. In one aspect, output portion 1108 may automatically output the text program every time a change is generated in the association information about comment 130 and program component 110.

Figure 12:
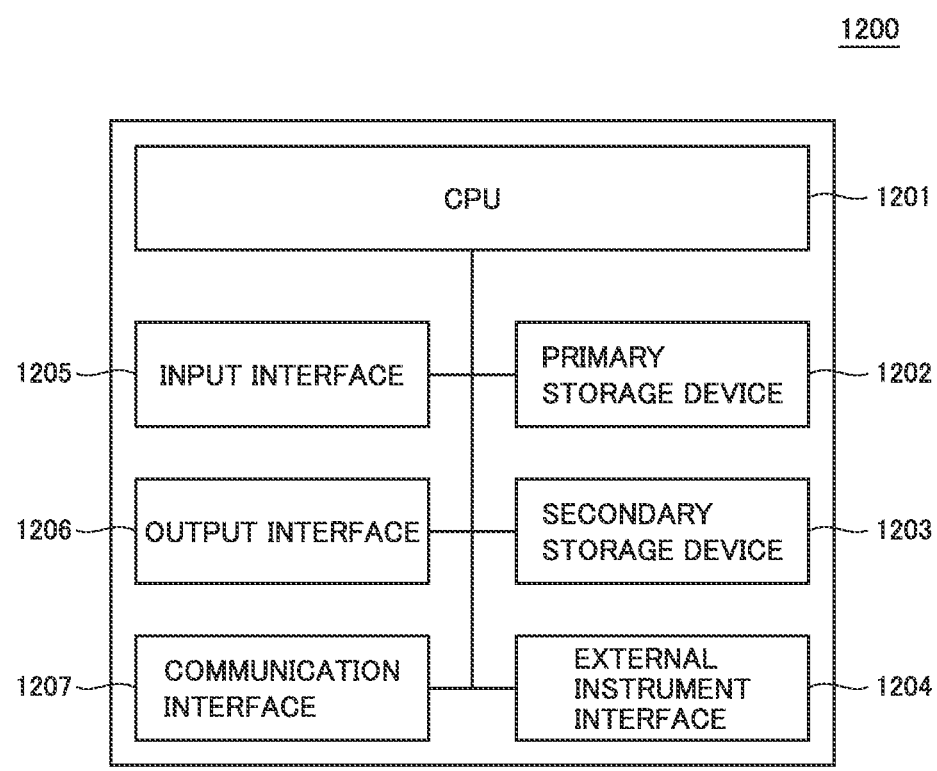
FIG. 12 is a view illustrating an example of a hardware configuration of a device 1200 executing a program of the visual programming editor 100.

FIG. 12 is a view illustrating an example of a hardware configuration of a device 1200 executing the program of visual programming editor 100. In one aspect, visual programming editor 100 may be executed as the program on one device 1200. Furthermore, in another aspect, visual programming editor 100 may be executed as the program on a system including a plurality of devices 1200. Furthermore, in another aspect, visual programming editor 100 may be executed in a cloud environment including the plurality of devices 1200, and may be operated from another terminal through a browser.

Device 1200 includes a central processing unit (CPU) 1201, primary storage device 1202, secondary storage device 1203, an external instrument interface 1204, an input interface 1205, an output interface 1206, and a communication interface 1207.

CPU 1201 can execute the program implementing various functions of device 1200. CPU 1201 is constructed with at least one integrated circuit. For example, the integrated circuit may include at least one CPU, at least one field programmable gate array (FPGA), or a combination thereof.

Primary storage device 1202 stores the program executed by CPU 1201 and data referred to by CPU 1201. In one aspect, primary storage device 1202 may be implemented by a dynamic random access memory (DRAM), a static random access memory (SRAM), or the like.

Secondary storage device 1203 is a nonvolatile memory, and may store the program executed by CPU 1201 and the data referred to by CPU 1201. In this case, CPU 1201 executes the program read from secondary storage device 1203 to primary storage device 1202, and refers to the data read from secondary storage device 1203 to primary storage device 1202. In one aspect, secondary storage device 1203 may be implemented by a hard disk drive (HDD), a solid state drive (SSD), an erasable programmable read only memory (EPROM), an electrically erasable programmable read only memory (EEPROM), a flash memory, or the like.

External instrument interface 1204 can be connected to any external device such as a printer, a scanner, and an external HDD. In one aspect, external instrument interface 1204 may be implemented by a universal serial bus (USB) terminal or the like.

Input interface 1205 can be connected to any input device such as a keyboard, a mouse, a touchpad, or a game pad. In one aspect, input interface 1205 may be implemented by a USB terminal, a PS/2 terminal, a Bluetooth (registered trademark) module, and the like.

Output interface 1206 can be connected to any output device such as a cathode ray tube display, a liquid crystal display, or an organic electro-luminescence (EL) display. In one aspect, output interface 1206 may be implemented by a USB terminal, a D-sub terminal, a digital visual interface (DVI) terminal, a high-definition multimedia interface (HDMI) (registered trademark) terminal, or the like.

Communication interface 1207 is connected to a wired or wireless network device. In one aspect, communication interface 1207 may be implemented by a wired local area network (LAN) port, a wireless fidelity (Wi-Fi (registered trademark)) module, or the like. In another aspect, communication interface 1207 may transmit and receive the data using a communication protocol such as a Transmission Control Protocol/Internet Protocol (TCP/IP) or a user datagram protocol (UDP).

<E. Flowchart>

With reference to FIGS. 13 to 16, a processing procedure of the control of associating comment 130 and program component 110 will be described below. In one aspect, CPU 1201 may read the program for executing the processing in FIGS. 13 to 16 from secondary storage device 1203 to primary storage device 1202 and execute the program. In another aspect, a part or all of the processing can be implemented as a combination of circuit elements configured to execute the processing.

Figure 13:
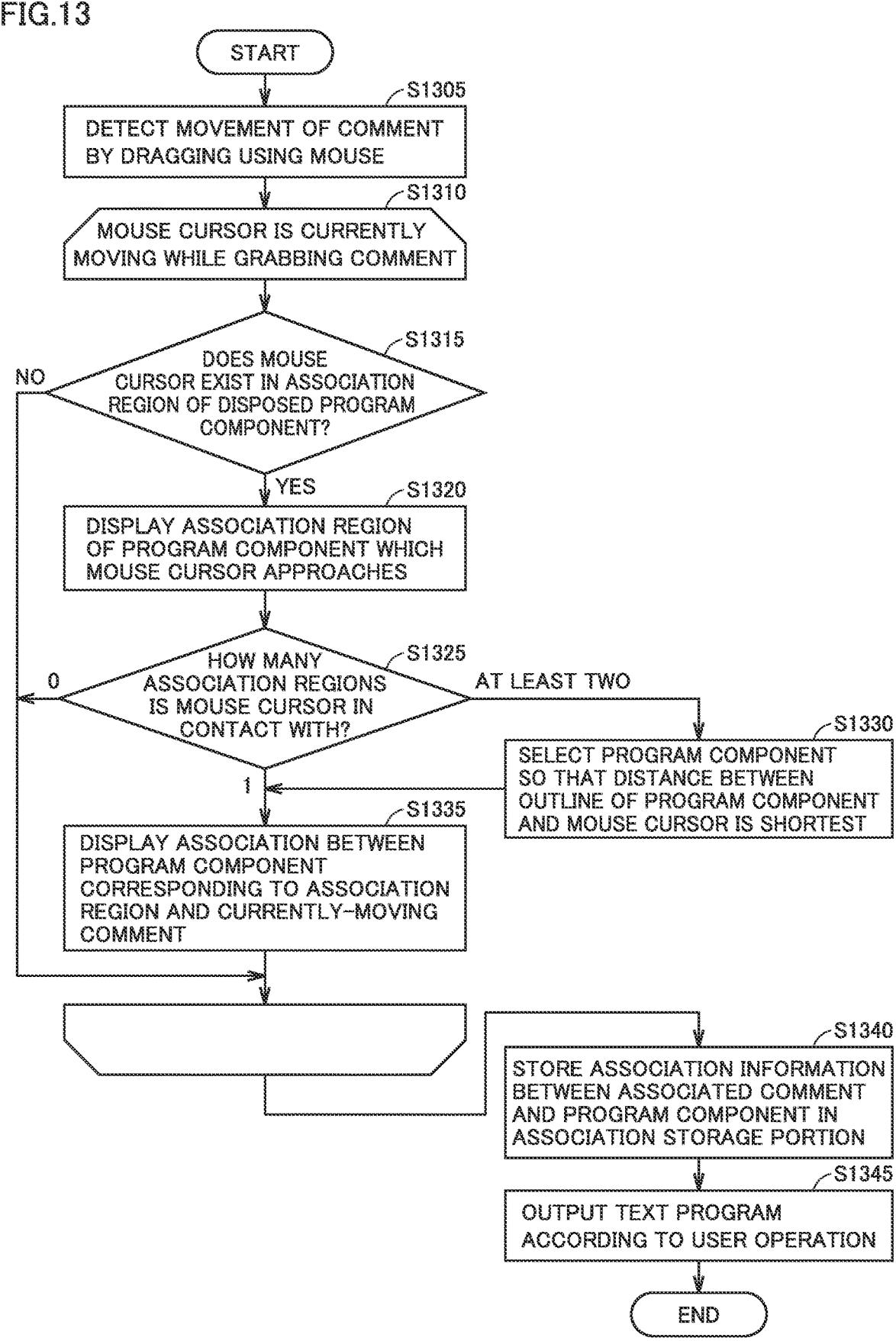
FIG. 13 is a view illustrating an example of first association processing of the comment 130 and the program component 110.

FIG. 13 is a view illustrating an example of first association processing of comment 130 and program component 110. The processing in FIG. 13 is processing in the case where the user moves comment 130 by dragging the mouse on visual programming editor 100.

In step S1305, visual programming editor 100 detects the movement of comment 130 by the mouse. In step S1310, visual programming editor 100 repeatedly executes pieces of processing from steps S1315 to S1335 when the mouse cursor moves while grabbing comment 130.

In step S1315, visual programming editor 100 determines whether the mouse cursor exists in association region 201 of disposed program component 110. When visual programming editor 100 determines that the mouse cursor exists in association region 201 of disposed program component 110 (YES in step S1315), the control proceeds to step S1325. Otherwise (NO in step S1315), visual programming editor 100 executes the processing of step S1315 again. In one aspect, visual programming editor 100 may determine whether comment 130 grabbed by the mouse cursor exists in association region 201 of disposed program component 110.

In step S1320, visual programming editor 100 displays association region 201 of program component 110 which the mouse cursor approaches. More specifically, when the mouse cursor or comment 130 grabbed by the mouse cursor is in contact with reaction region 601 of program component 110, visual programming editor 100 displays association region 201 of program component 110.

In step S1325, visual programming editor 100 determines the number of association regions 201 with which the mouse cursor is in contact. In one aspect, visual programming editor 100 may determine the number of association regions 201 with which comment 130 grabbed by the mouse cursor is in contact.

When visual programming editor 100 determines that the number of association regions 201 with which the mouse cursor is in contact is at least two, the control proceeds to step S1330. When visual programming editor 100 determines that the number of association regions 201 with which the mouse cursor is in contact is one, the control proceeds to step S1335. When visual programming editor 100 determines that the number of association regions 201 with which the mouse cursor is in contact is zero, the control proceeds to step S1315.

In step S1330, visual programming editor 100 selects program component 110 corresponding to the shortest distance between the contour of program component 110 and the mouse cursor as a target associated with comment 130. In one aspect, visual programming editor 100 may select program component 110 corresponding to the shortest distance between the outline of program component 110 and the outline of comment 130 grabbed by the cursor as a target associated with comment 130.

In step S1335, visual programming editor 100 displays the association between program component 110 corresponding to association region 201 with which the mouse cursor or comment 130 grabbed by the mouse cursor is in contact and currently-moving comment 130 by the mouse cursor. In one aspect, visual programming editor 100 may connect associated comment 130 and program component 110 by a comment connector. In another aspect, visual programming editor 100 may frame associated comment 130 and program component 110. In still another aspect, visual programming editor 100 may change the color of associated comment 130 and program component 110. Furthermore, in another aspect, visual programming editor 100 may appropriately combine these display methods.

In step S1340, visual programming editor 100 stores the association information between associated comment 130 and program components 110 in association storage portion 1107.

In step S1345, visual programming editor 100 outputs the text program corresponding to the visual program prepared by visual programming editor 100 according to the user operation.

Figure 14:
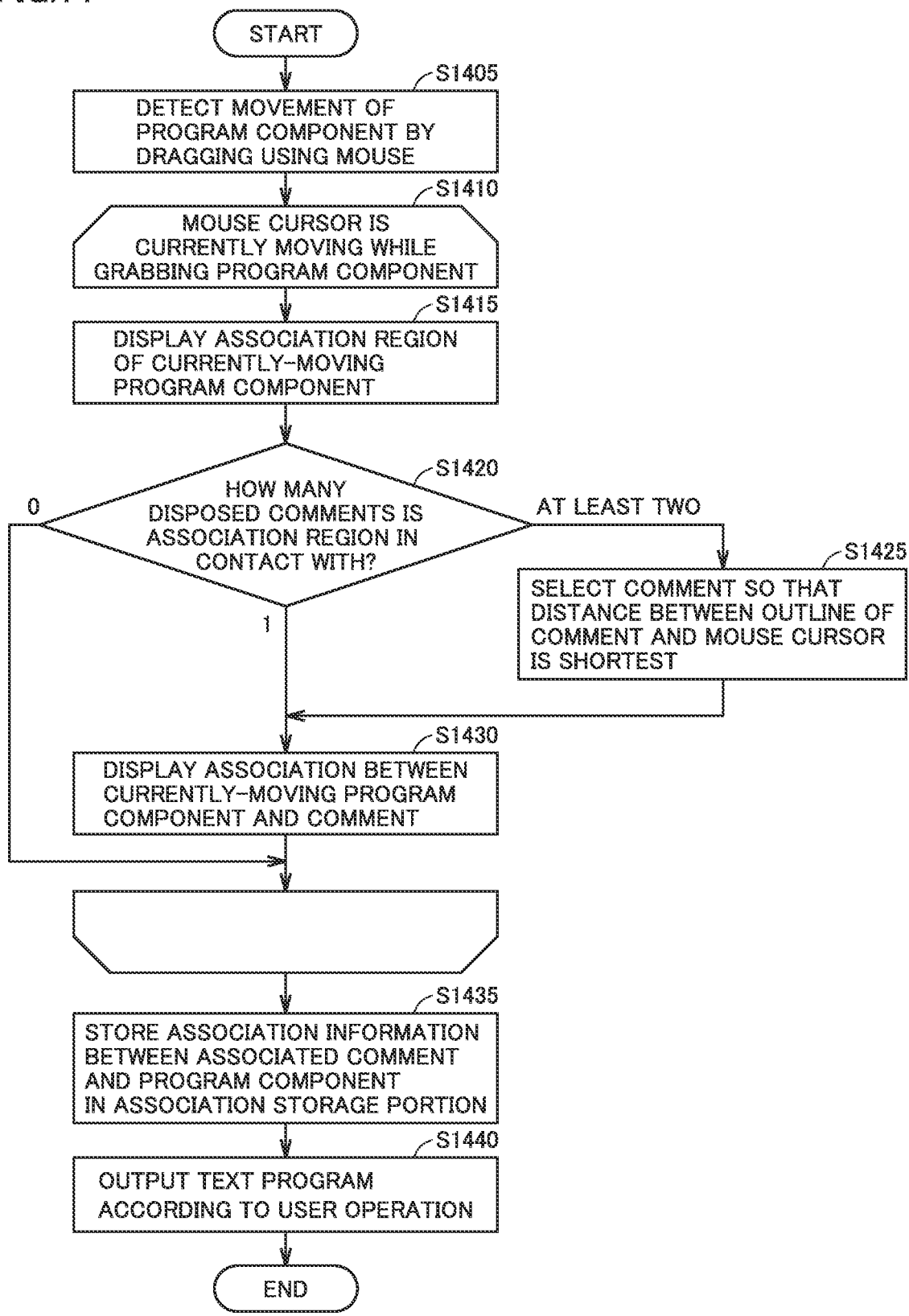
FIG. 14 is a view illustrating an example of second association processing of the comment 130 and the program component 110.

FIG. 14 is a view illustrating an example of second association processing of comment 130 and program component 110. The processing in FIG. 14 is different from the processing in FIG. 13 in that it is processing in the case where the user moves program component 110 by dragging on visual programming editor 100.

In step S1405, visual programming editor 100 detects the movement of program component 110 by the mouse. In step S1410, visual programming editor 100 repeatedly executes the pieces of processing from steps S1415 to S1430 when the mouse cursor moves while grabbing program component 110. In step S1415, visual programming editor 100 displays association region 201 of the currently-moving program component 110.

In step S1420, visual programming editor 100 determines the number of comments 130 in contact with association region 201 of currently-moving program component 110. When visual programming editor 100 determines that the number of comments 130 in contact with association region 201 of currently-moving program component 110 is at least two, the control proceeds to step S1425. When visual programming editor 100 determines that the number of comments in contact with association region 201 of currently-moving program component 110 is one, the control proceeds to step S1430. When visual programming editor 100 determines that the number of comments in contact with association region 201 of currently-moving program component 110 is zero, the control proceeds to step S1415.

In step S1425, visual programming editor 100 selects comment 130 corresponding to the shortest distance between the outline of comment 130 and the mouse cursor as the target associated with program component 110. In one aspect, visual programming editor 100 may select comment 130 corresponding to the shortest distance between the contour of comment 130 and the contour of program component 110 grabbed by the cursor as the target associated with program component 110.

In step S1430, visual programming editor 100 displays the association between currently-moving program component 110 by the mouse cursor and comment 130. In one aspect, visual programming editor 100 may connect associated comment 130 and program component 110 by a comment connector. In another aspect, visual programming editor 100 may frame associated comment 130 and program component 110. In still another aspect, visual programming editor 100 may change the color of associated comment 130 and program component 110. Furthermore, in another aspect, visual programming editor 100 may appropriately combine these display methods.

In step S1435, visual programming editor 100 stores the association information between associated comment 130 and program components 110 in the association storage portion 1107.

In step S1440, visual programming editor 100 outputs the text program corresponding to the visual program prepared by visual programming editor 100 according to the user operation.

Figure 15:
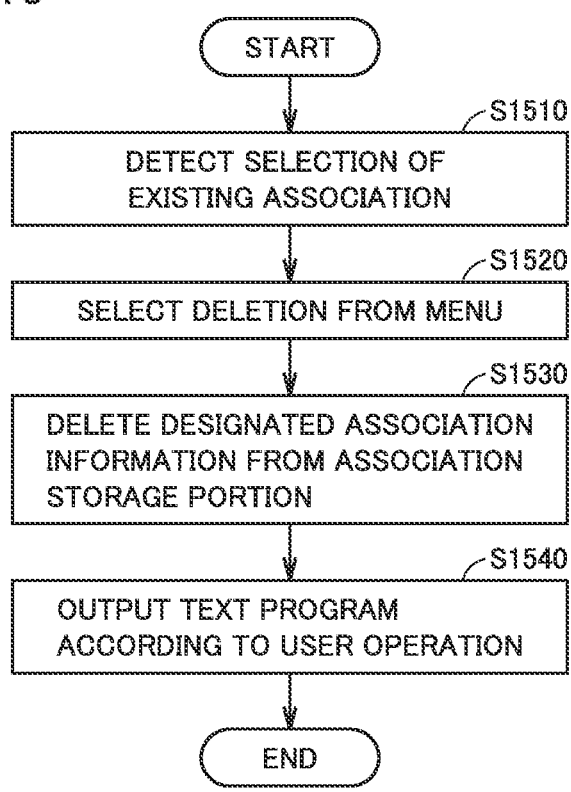
FIG. 15 is a view illustrating an example of third association processing of the comment 130 and the program component 110.

FIG. 15 is a view illustrating an example of third association processing of comment 130 and program component 110. The processing in FIG. 15 is different from the processing in FIGS. 13 and 14 in that the user manually deletes the association between comment 130 and program component 110.

In step S1510, visual programming editor 100 detects that the association of existing comment 130 and program component 110 is selected. In one aspect, visual programming editor 100 may detect that the association of existing comment 130 and program component 110 is selected based on arbitrary input such as a user opening a menu by right clicking the comment connector with the mouse.

In step S1520, visual programming editor 100 detects that the deletion of the association between comment 130 and program component 110 is selected from the menu. In one aspect, visual programming editor 100 may detect double click or the like of the connector for comment instead of the menu operation.

In step S1530, visual programming editor 100 deletes the association information about specified comment 130 and program component 110 from association storage portion 1107.

In step S1540, visual programming editor 100 outputs the text program corresponding to the visual program reflecting the pieces of processing in steps S1510 to S1530 according to the user operation.

Figure 16:
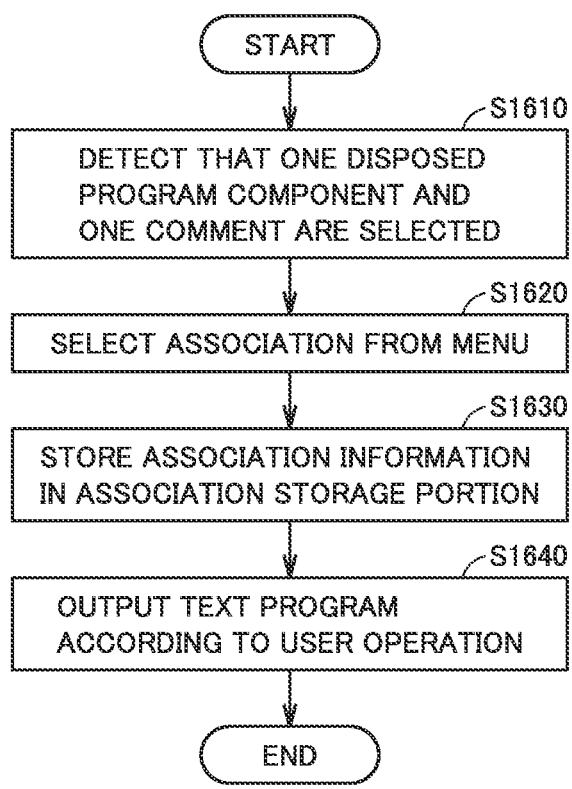
FIG. 16 is a view illustrating an example of fourth association processing of the comment 130 and the program component 110.

FIG. 16 is a view illustrating an example of fourth association processing of comment 130 and program component 110. The processing in FIG. 16 is different from the processing in FIGS. 13 to 15 in that the user manually associates comment 130 and program component 110.

In step S1610, visual programming editor 100 detects that one disposed program component 110 and one disposed comment 130 are selected. In one aspect, visual programming editor 100 may detect that one placed program component 110 and one placed comment 130 are selected based on any input by the user, such as the clicking of program component 110 and comment 130 with a mouse.

In step S1620, visual programming editor 100 detects that the association of comment 130 and program component 110 is selected from the menu. In one aspect, visual programming editor 100 may detect that the association is selected from the menu in a menu bar of visual programming editor 100. In another aspect, visual programming editor 100 may detect that the association is selected from the menu displayed by right clicking of the mouse.

In step S1630, visual programming editor 100 stores the association information about associated comment 130 and program component 110 in association storage portion 1107.

In step S1640, visual programming editor 100 outputs the text program corresponding to the visual program reflecting the pieces of processing in steps S1610 to S1630 according to the user operation.

In one aspect, visual programming editor 100 can be executed on any information processing device such as a personal computer, a smartphone, or a tablet. Furthermore, in another aspect, any operation such as the movement of comment 130 or program component 110 on visual programming editor 100, and the display of the menu may be performed through any input means such as a keyboard, a mouse, a touch panel, and a voice.

As described above, visual programming editor 100 generates the text program based on the visual program prepared on editor 102. At that time, visual programming editor 100 can dispose the comment at an appropriate position on the text program based on the comment and the association information about the program component. With this function, the user can obtain the text program with high readability.

Visual programming editor 100 also provides the manual association function or association deletion function of manual comment 130 and program component 110. With this function, the user can more flexibly perform the association operation of comment 130 and program component 110.

<F. Appendix>

The above embodiment includes the following technical ideas.

[Configuration 1]

A program causing at least one processor (1201) to execute: disposing one or a plurality of program components (110) and one or a plurality of comments (130) on a screen of a visual programming editor (100) based on acceptance of an operation; determining whether to associate a specific comment with a specific program component based on a positional relationship between the specific comment included in the one or the plurality of comments and the specific program component included in the one or the plurality of program components; and generating a text-based code (150) in which a text of the specific comment and a text of the specific program component are disposed nearby based on the determination that the specific comment is associated with the specific program component.

[Configuration 2]

The program described in configuration 1, in which the determining whether to associate the specific comment with the specific program component includes: determining whether a distance from the specific comment to the specific program component is less than or equal to a threshold that is predetermined; and associating the specific comment and the specific program component based on the distance that is less than or equal to the threshold.

[Configuration 3]

The program described in configuration 2, further causing the at least one processor to execute disposing a text of a comment that is not associated with any of the one or the plurality of program components at a head of the text-based code in the text-based code based on the comment that is not associated with any of the one or the plurality of program components.

[Configuration 4]

The program described in configuration 2 or 3, further causing the at least one processor to execute displaying a range of the threshold based on acceptance of an operation of bringing the specific comment close to a certain range of the specific program component.

[Configuration 5]

The program described in any one of configurations 2 to 4, in which disposing the one or the plurality of program components and the one or the plurality of comments on the screen of the visual programming editor includes disposing a first program component, a second program component, and the specific comment, and the program further causes the at least one processor to execute associating the specific comment with the component with the shortest distance to the specific comment between the first program component and the second program component based on a fact that a distance between the specific comment and each of the first program component and the second program component is less than or equal to the threshold.

[Configuration 6]

The program described in configuration 5, further causing the at least one processor to execute setting a certain range close to both the first program component and the second program component to an invalid range in which the specific comment is not associated with each of the first program component and the second program component when the first program component and the second program component are disposed adjacent to each other.

[Configuration 7]

The program described in any of configurations 2 to 6, in which the disposing the one or the plurality of program components and the one or the plurality of comments on the screen of the visual programming editor includes disposing the specific program component, a first comment, and a second comment, and the program further includes determining display order of the first comment and the second comment in the text-based code based on a distance from each of the first comment and the second comment to the specific program component based on a fact that both the first comment and the second comment are associated with the specific program component.

[Configuration 8]

The program described in any one of configurations 2 to 7, further causing the at least one processor to execute releasing association between the specific comment and the specific program component based on acceptance of an operation to separate the distance between the specific comment and the specific program component that are associated with each other by more than the threshold.

[Configuration 9]

The program described in any one of configurations 2 to 8, further causing the at least one processor to execute releasing the association of the specific comment and the specific program component and separate the distance between the specific comment and the specific program component by more than the threshold based on double-clicking of the specific comment associated with the specific program component.

[Configuration 10]

The program described in any one of configurations 2 to 9, further causing the at least one processor to execute associating or association-releasing the specific comment and the specific program component regardless of the distance between the specific comment and the specific program component based on acceptance of input of a manual association control instruction.

[Configuration 11]

The program described in any one of configurations 2 to 10, further causing the at least one processor to execute changing a color of the specific comment and the specific program component that are associated with each other based on associating the specific comment and the specific program component.

[Configuration 12]

The program described in any one of configurations 2 to 11, further causing the at least one processor to execute displaying a connection line for the specific comment and the specific program component that are associated with each other based on the association of the specific comment and the specific program component.

[Configuration 13]

The program described in any one of configurations 2 to 12, further causing the at least one processor to execute displaying a frame enclosing the specific comment and the specific program component that are associated with each other based on the association of the specific comment and the specific program component.

[Configuration 14]

A computer (1200) including: a memory (1202) storing the program described in any one of configurations 1 to 13; and at least one processor configured to execute the program.

[Configuration 15]

A method related to code conversion in a computer, the method including: disposing one or a plurality of program components and one or a plurality of comments on a screen of a visual programming editor based on acceptance of an operation; determining whether to associate a specific comment with a specific program component based on a positional relationship between the specific comment included in the one or the plurality of comments and the specific program component included in the one or the plurality of program components; and generating a text-based code in which a text of the specific comment and a text of the specific program component are disposed nearby based on the determination that the specific comment is associated with the specific program component.

It should be considered that the disclosed embodiment is an example in all respects and not restrictive. The scope of the present disclosure is defined by not the description above, but the claims, and it is intended that all modifications within the meaning and scope of the claims and their equivalents are included in the present invention. In addition, the disclosed contents described in the embodiment and the modification are intended to be implemented alone or in combination as much as possible.

REFERENCE SIGNS LIST

100: visual programming editor, 101: program component list, 102: editor, 105, 300, 400: visual program, 110, 110A, 110B, 110C, 110E, 810A, 810C, 810D: program component, 120, 120A, 120B: connector, 130, 130A, 130B, 130C, 130D, 151A, 151C, 351C, 451A, 451B, 830A, 830B, 830C, 830E, 830F, 1030A, 1030C, 1030E, 1030F: comment, 150, 350, 450, 1050: text program, 152A, 152C, 352A, 352C, 452A, 1010A, 1010C, 1010D: code, 201, 701: association region, 210, 220, 230: display, 601: reaction region, 705: adjacent part, 710: invalid region, 1101: comment disposition portion, 1102: association range display portion, 1103: association selection portion, 1104: association display portion, 1105: dynamic association portion, 1106: manual association portion, 1107: association storage portion, 1108: output portion, 1200: device, 1201: CPU, 1202: primary storage device, 1203: secondary storage device, 1204: external instrument interface, 1205: input interface, 1206: output interface, 1207: communication interface

The invention claimed is:

1. A non-transitory computer-readable medium comprising a program causing at least one processor to execute:
disposing one or a plurality of program components and one or a plurality of comments on a screen of a visual programming editor based on acceptance of an operation;
determining whether to associate a specific comment with a specific program component based on a positional relationship between the specific comment included in the one or the plurality of comments and the specific program component included in the one or the plurality of program components; and
generating a text-based code in which a text of the specific comment and a text of the specific program component are disposed nearby based on the determination that the specific comment is associated with the specific program component.

2. The non-transitory computer-readable medium according to claim 1, wherein the determining whether to associate the specific comment with the specific program component includes:
determining whether a distance from the specific comment to the specific program component is less than or equal to a threshold that is predetermined; and
associating the specific comment and the specific program component based on the distance that is less than or equal to the threshold.

3. The non-transitory computer-readable medium according to claim 2, the program further causing the at least one processor to execute disposing a text of a comment that is not associated with any of the one or the plurality of program components at a head of the text-based code in the text-based code based on the comment that is not associated with any of the one or the plurality of program components.

4. The non-transitory computer-readable medium according to claim 2, the program further causing the at least one processor to execute displaying a range of the threshold based on acceptance of an operation of bringing the specific comment close to a certain range of the specific program component.

5. The non-transitory computer-readable medium according to claim 2, wherein disposing the one or the plurality of program components and the one or the plurality of comments on the screen of the visual programming editor includes disposing a first program component, a second program component, and the specific comment, and
the program further causes the at least one processor to execute associating the specific comment with the component with the shortest distance to the specific comment between the first program component and the second program component based on a fact that a distance between the specific comment and each of the first program component and the second program component is less than or equal to the threshold.

6. The non-transitory computer-readable medium according to claim 5, the program further causing the at least one processor to execute setting a certain range close to both the first program component and the second program component to an invalid range in which the specific comment is not associated with each of the first program component and the second program component when the first program component and the second program component are disposed adjacent to each other.

7. The non-transitory computer-readable medium according to claim 2, wherein the disposing the one or the plurality of program components and the one or the plurality of comments on the screen of the visual programming editor includes disposing the specific program component, a first comment, and a second comment, and
the program further includes determining display order of the first comment and the second comment in the text-based code based on a distance from each of the first comment and the second comment to the specific program component based on a fact that both the first comment and the second comment are associated with the specific program component.

8. The non-transitory computer-readable medium according to claim 2, the program further causing the at least one processor to execute releasing association between the specific comment and the specific program component based on acceptance of an operation to separate the distance between the specific comment and the specific program component that are associated with each other by more than the threshold.

9. The non-transitory computer-readable medium according to claim 2, the program further causing the at least one processor to execute releasing the association of the specific comment and the specific program component and separate the distance between the specific comment and the specific program component by more than the threshold based on double-clicking of the specific comment associated with the specific program component.

10. The non-transitory computer-readable medium according to claim 2, the program further causing the at least one processor to execute associating or association-releasing the specific comment and the specific program component regardless of the distance between the specific comment and the specific program component based on acceptance of input of a manual association control instruction.

11. The non-transitory computer-readable medium according to claim 2, the program further causing the at least one processor to execute changing a color of the specific comment and the specific program component that are associated with each other based on associating the specific comment and the specific program component.

12. The non-transitory computer-readable medium according to claim 2, the program further causing the at least one processor to execute displaying a connection line for the specific comment and the specific program component that are associated with each other based on the association of the specific comment and the specific program component.

13. The non-transitory computer-readable medium according to claim 2, the program further causing the at least one processor to execute displaying a frame enclosing the specific comment and the specific program component that are associated with each other based on the association of the specific comment and the specific program component.

14. A computer comprising:
a memory storing the program according to claim 1; and
at least one processor configured to execute the program.

15. A method related to code conversion in a computer, the method comprising:
disposing one or a plurality of program components and one or a plurality of comments on a screen of a visual programming editor based on acceptance of an operation;
determining whether to associate a specific comment with a specific program component based on a positional relationship between the specific comment included in the one or the plurality of comments and the specific program component included in the one or the plurality of program components; and generating a text-based code in which a text of the specific comment and a text of the specific program component are disposed nearby based on the determination that the specific comment is associated with the specific program component.

\* \* \* \* \*